(12) United States Patent
Grammelsberger (10) Patent No.: US 8,500,997 B2
(45) Date of Patent: Aug. 6, 2013

(54) SCREENING GRID

(76) Inventor: Axel Grammelsberger, Rodgau (DE)

( * ) Notice: Subject to any disclaimer, the term of this patent is extended or adjusted under 35 U.S.C. 154(b) by 1659 days.

(21) Appl. No.: 10/599,053

(22) PCT Filed: Jan. 21, 2005

(86) PCT No.: PCT/EP2005/000573
§ 371 (c)(1),
(2), (4) Date: Sep. 18, 2006

(87) PCT Pub. No.: WO2005/097290
PCT Pub. Date: Oct. 20, 2005

(65) Prior Publication Data
US 2011/0139703 A1    Jun. 16, 2011

(30) Foreign Application Priority Data
Mar. 19, 2004    (DE) .................. 10 2004 014 022

(51) Int. Cl.
*B01D 33/04* (2006.01)
(52) U.S. Cl.
USPC ............................ 210/160; 210/158
(58) Field of Classification Search
None
See application file for complete search history.

(56) References Cited

U.S. PATENT DOCUMENTS

| | | | |
|---|---|---|---|
| 4,188,294 A | | 2/1980 | Hagihara |
| 5,059,313 A | * | 10/1991 | Etschel et al. ............ 210/155 |
| 5,387,336 A | * | 2/1995 | Bormet et al. ............ 210/158 |
| 7,722,762 B2 | * | 5/2010 | Zubair .................... 210/160 |
| 7,972,503 B2 | * | 7/2011 | Wilcher et al. ............ 210/159 |
| 8,092,674 B2 | * | 1/2012 | Heil ....................... 210/158 |
| 2011/0139703 A1 | * | 6/2011 | Grammelsberger ...... 210/400 |

FOREIGN PATENT DOCUMENTS

| | | |
|---|---|---|
| DE | 2401956 A1 | 7/1975 |
| EP | 0542191 A | 5/1993 |
| EP | 0578559 A | 1/1994 |

OTHER PUBLICATIONS

International Search Report from International Application PCT/EP2005/000573.
International Preliminary Examination Report from International Application PCT/EP2005/000573.

* cited by examiner

*Primary Examiner* — Robert James Popovics
(74) *Attorney, Agent, or Firm* — WRB-IP LLP (57) ABSTRACT

A screening grid for discharging solids from a liquid flow. The grid includes a driveable screening strip that can be inserted into the liquid flow and includes two lateral link chains between which carrying rods extend, carrying groups of adjacent screening links. All screening links include projecting parts that extend respectively only in one direction from a group of screening grids, without being overlapped by the projecting parts of the adjacent group of screening links. All of the screening links of a group are provided with projecting hooks on the outer side of the screening strip.

12 Claims, 7 Drawing Sheets

SCREENING GRID

The invention concerns a screening grid for discharging solids from a liquid flow, said grid comprising a driveable screening strip that can be inserted into the liquid flow and comprising two lateral link chains between which carrying rods extend, carrying groups of adjacent screening links at least some of which have a hook, with each group of screening links being arranged on two carrying rods independent of the preceding and subsequent group of screening links and with the screening links having projecting parts that extend past the carrying rods.

Such screening grids are used to mechanically remove solids that exceed a given particle size from liquids. A typical area of application is the cleaning of wastewater prior to the treatment in sewage treatment plants.

For this purpose different designs of screening or filtering grids are known. The majority of such screening grids, like a continuous lift, have continuous rotating, driveable screening strips that are comprised of individual screening links whose spaces form the screening area through which the liquid stream, such as waste water, streams. At least some screening links have hooks that are used to pick up the solids when the screening strip is in motion and that discharge the solids from the liquid flow. At the head of the screening strip the solids are thrown onto a conveyor device. To remove materials that are stuck, it is possible to use a driveable brush, for example.

In a known screening grid as described in the introduction (EP 0 581 770 B1) the projecting parts of the screening links of adjacent groups engage in a comb-like manner and form the screening areas between adjacent groups of screening links. During the reversing movement at the upper and lower end of the screening strip the projecting parts of the two adjacent groups of screening links must carry out a swiveling motion relative to one another. The resulting scissor effect between adjacent projecting parts can cause solids, especially hard materials or materials with long fibers, to get stuck between the projecting parts that move like scissors, which could impede the function of the screening grid.

Since the gap width of the screening grid is determined by the distance of the projecting parts that engage in a comb-like manner in the area of two groups of screening links, additional intermediate screening links must be arranged between adjacent screening links of the same group in the area between the two carrying rods with said additional intermediate screening links not having any projecting parts. The necessity to provide two different types of screening links significantly increases the cost for the manufacture and repair of said screening grid.

The object of the invention therefore is to provide a screening grid as described in the introduction so that it only has one type of screening link and that obstructions due to solids that get stuck due to the scissor-like movement of the projecting parts are avoided.

This object is attained in accordance with the invention in that all screening links have projecting parts that only protrude in one direction from a group of screening links and are arranged without overlapping with projecting parts of the adjacent group of screening links.

Since overlapping or comb-like engagement of projecting parts is avoided, there is no scissor-like movement that could cause the solids to get stuck. The gap width of the screening grid within each group of screening links as well as in the area between adjacent groups is solely determined by the mutual distance of the screening links that all are uniform. Additional intermediate screening links without projecting parts are not required. This considerably reduces manufacturing and repair costs. If necessary, the groups that are packets of screening links can easily be completely replaced.

The screening grid can be such that all screening links of a group are provided with projecting hooks on the outer side of the screening strip. It is also possible to arrange one or several groups of screening links without hooks between groups of screening links with hooks. In any case, the lateral distance of the hooks is identical to the lateral distance of the screening links in relation to one another. Thus the gap width between the hooks equals the gap width of the screening strip. This ensures that all solids that the screening grid catches are also carried along for the discharge motion and are not dropped to the floor where solids would collect and would have to be regularly removed.

It is practical for each projecting part to be a sector that increases in width towards the inside of the screening strip and whose center of the arc is arranged on the axis of the respective carrying rod. This ensures that there is not even an opening in the area of the reversal of the screening strip between adjacent groups of screening links but instead, the regular gap width of the screen is maintained.

Other advantageous embodiments of the inventive thought are the subject of additional sub-claims.

The invention is explained in more detail based on an exemplary embodiment that is shown in the drawing. The following is shown.

Figure 1:
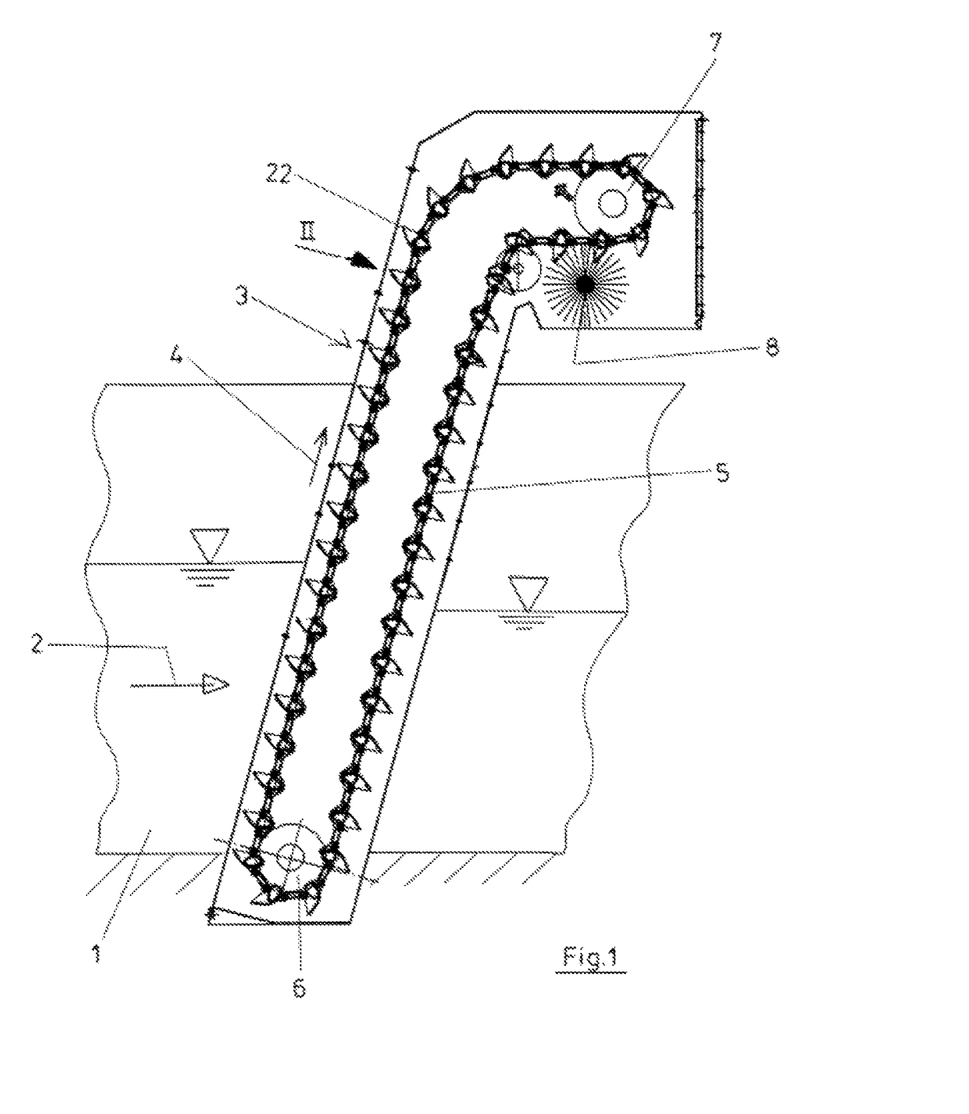
FIG. 1 shows a vertical section of a simplified view of a screening grid that is arranged in a wastewater stream.

The screening grid shown in FIG. 1 is used to discharge solids, especially large solids, from a liquid flow, for example a waste water stream, in a waste water channel 1 in the direction of arrow 2. The lower section of the screening grid 3 extends into the wastewater stream and from there extends laterally to the top past the wastewater channel 1. The screening grid has a screening strip 5 that is continuously or intermittently driveable in the direction of arrow 4 with said strip running over a lower deflection pulley 6 and an upper deflection pulley 7 that is driven by a drive (not shown).

Gravity causes the solids to be discharged. This can be supported by a—possibly driven—brush drum 8 and, if necessary, by a flushing mechanism (not shown).

Figure 2:
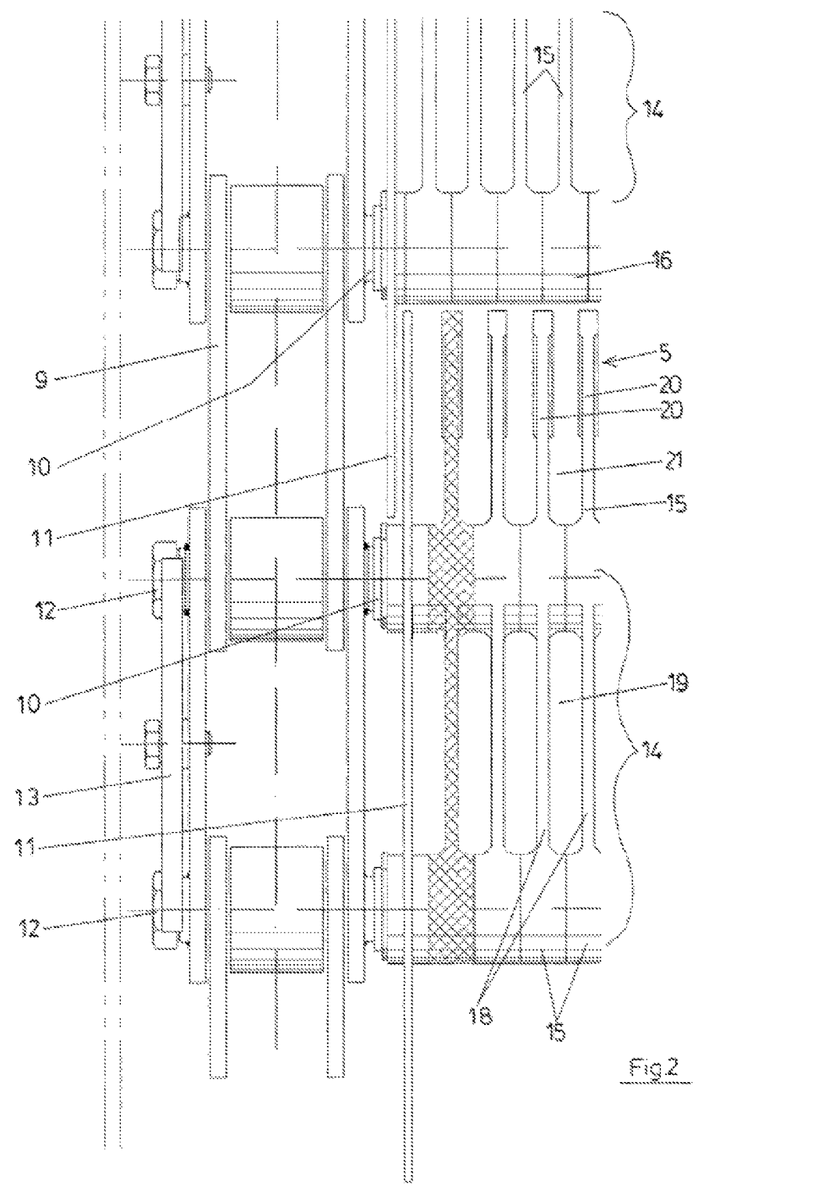
FIG. 2 shows an enlarged partial view in the direction of arrow II in FIG. 1.
Figure 3:
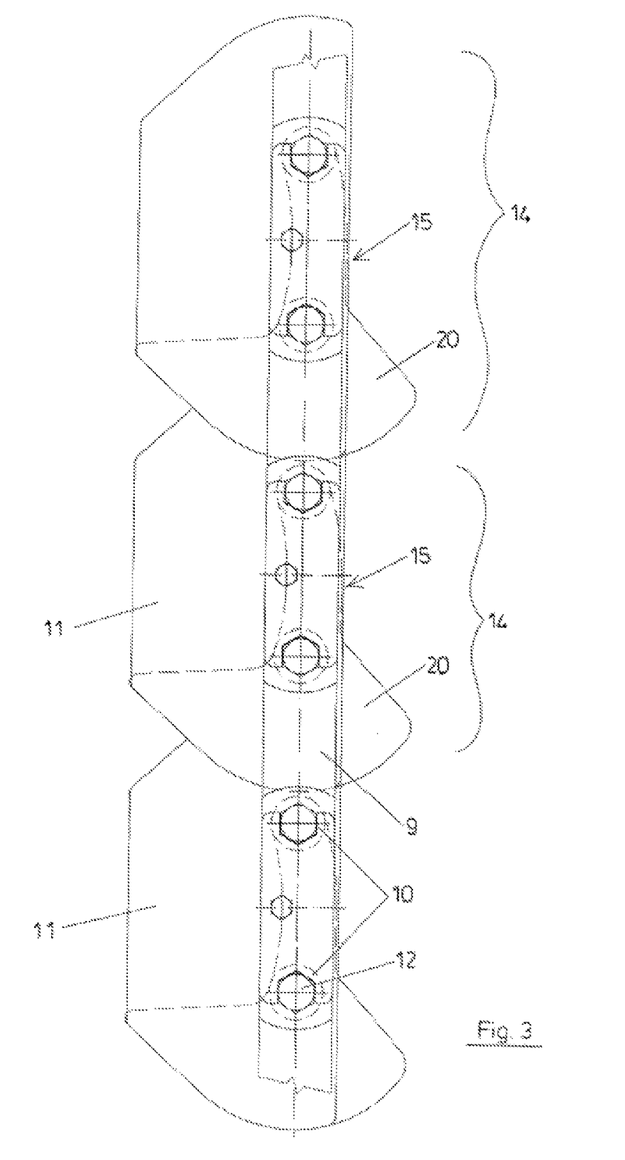
FIG. 3 shows a view in the direction of arrow III in FIG. 2.

As shown in detail in FIGS. 2 and 3, the screening strip 5 has two lateral link chains 9 that run over deflecting pulleys 6 and 7. Carrying rods 10 extend at regular intervals between the two link chains 9 with flat side plates 11 being arranged on said carrying rods directly next to the link chains 9 and with the plates together forming a lateral delimitation on both longitudinal sides of the screening strip 5.

The carrying rods 10 are fastened to the link chain 9 by means of fastening elements 12 (screws, bolts, etc.) and can be loosened. The fastening elements 12 can be secured with retaining elements 13.

Figure 4:
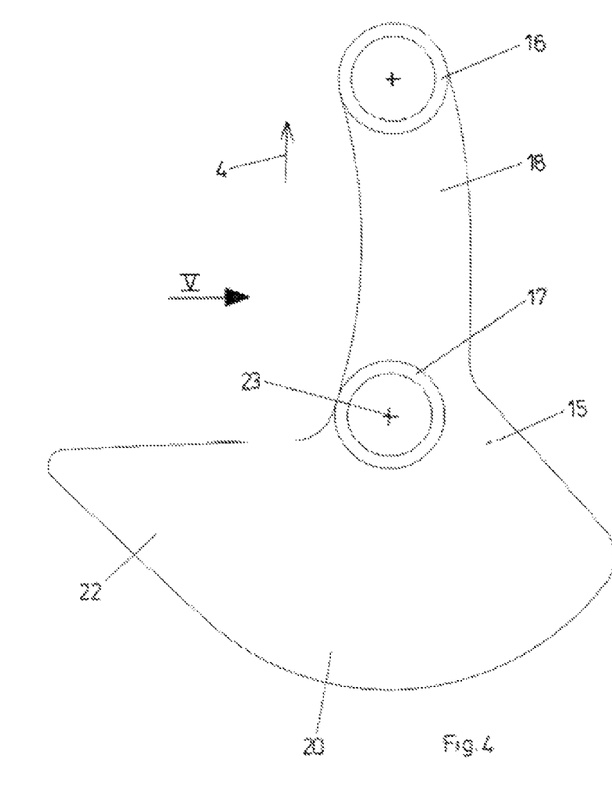
FIG. 4 shows a side view of an individual screening link.
Figure 5:
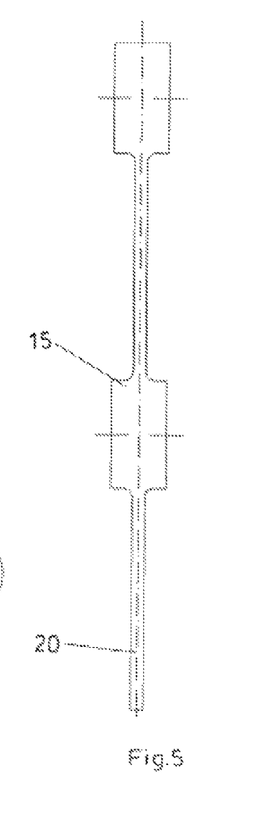
FIG. 5 shows a view of the screening link according to FIG. 4 in the direction of arrow V.

Two carrying rods 10 together carry a group 14 of screening grids 15 (FIGS. 4 and 5). Each screening link 15 has two bearing orifices 16, 17 that are arranged on the carrying rods 10 and are connected to each other via the center section 18. FIG. 2 shows that the bearing orifices 16 extend enough on both sides so that a screening gap 19 is formed between the center sections 18 of adjacent screening links 15 with the gap of the said screening gap determining the minimum size of the solids that are screened out.

All screening links 15 have projecting parts 20 that only extend in one direction of a group 14 of screening links 15 and project past the carrying rod 10. The gap 21 that is formed by two adjacent projecting parts 20 is as wide as the gap 19 between the center sections 18 of adjacent screening links 15. When mounted, the projecting parts 20 extend up to a short distance to the bearing orifices 16 of the adjacent group 14 of screening links 15.

All projecting parts 20 extend only in one direction of a group 14 of screening links 15 and do not overlap with the projecting parts 20 of the respective adjacent group 14.

In the exemplary embodiment shown in FIG. 1-5, all screening links 15 of a group 14 have a projecting hook 22 on the outer side of the screening strip 5. Each hook 22 is arranged on the projecting part 20. During the continuous or intermittent driven movement of the screening strip 5 the hooks 22 take up the solids that the screening strip catches and carry them to the head of the screening strip 5.

Each projecting part 20 is a sector that widens towards the inside of the screening strip 5. The center of the arc 23 (FIG. 4) of the sector is located in the middle of the bearing orifice 17 and thus is mounted on the axis of the respective carrying rod 10. This ensures that during a swiveling movement of the screening links 15 when running over deflection pulleys 6 and 7, the gap between the screening links 15 of adjacent groups 14 does not widen and that there is no scissor movement that could cause solids to get stuck.

In the arrangement shown in FIG. 3, the screening links 15 of adjacent groups are offset in relation to one another by half, i.e. by half the width of the screening links 15. It is also possible to arrange the screening links 15 of subsequent groups 14 so that the screening links 15 are aligned with one another.

In the exemplary embodiment shown, the screening links 15 are arranged directly adjacent to one another on the carrying rod 12. The bearing orifices 16, 17 form spacer sleeves that project from the sides. It is also possible to have flat screening links 15 and to separate adjacent screening links 15 by way of separate spacer sleeves.

The screening link 15 shown in FIG. 4 is arranged in the screening strip 5 in a manner that ensures that the projecting part 20 carrying the hook 22 follows in the direction of arrow 4 during the conveyor movement.

Figure 6:
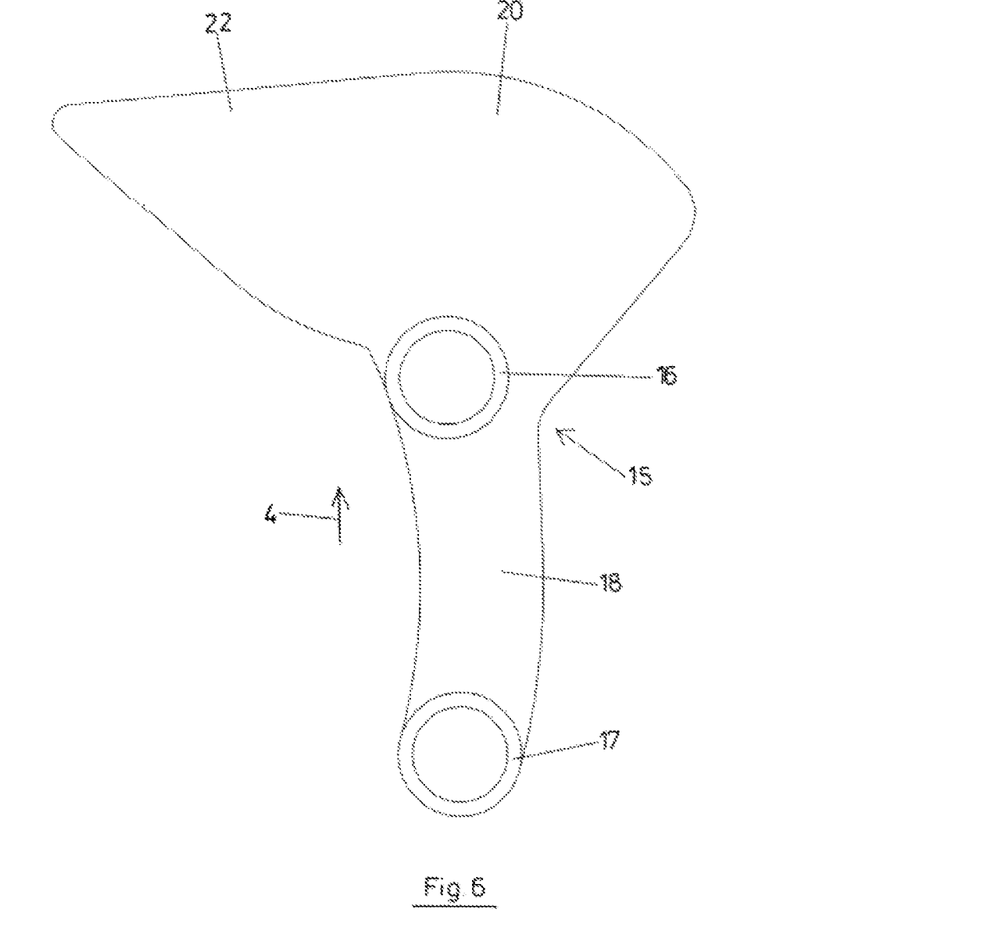
FIG. 6-8 show side views of different embodiments of screening links according to FIG. 4

The screening link 15 shown in FIG. 6 is different only in that the projecting part 20 runs ahead in the direction of arrow 4 during movement with the projecting part 20 that runs ahead carrying the hook 22.

Figure 7:
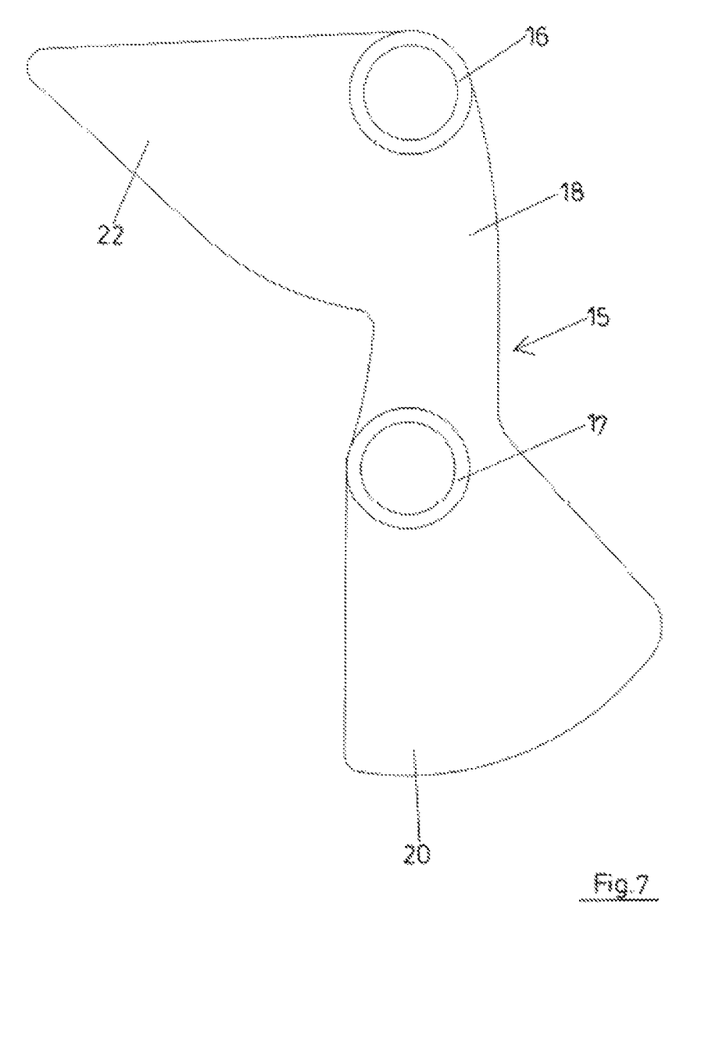

Contrary to that, the hook 22 in the embodiment of the screening link 15 according to FIG. 7 is arranged on the center section 18 that bridges the two carrying rods.

Figure 8:
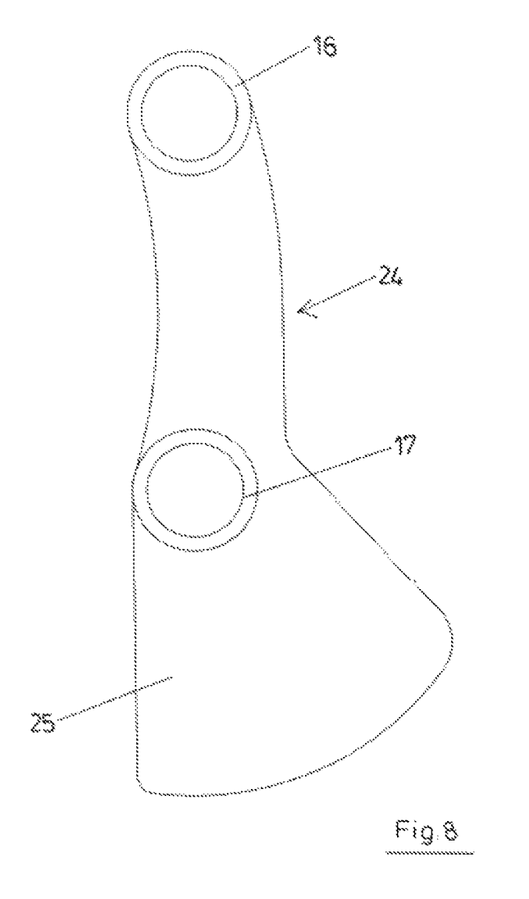

FIG. 8 shows a screening link 24 without hook. The screening link 23 also has a projecting part 25. Such screening links 23 without hooks are also combined into groups adjacent to one another on two carrying rods 10.

One or several groups of screening links 23 without hooks can be arranged between groups 14 of screening links 15 with hooks 22.

The gap width of the screening strip 5 remains the same for all screening links shown in all material carrying (discharge material) movement locations of the screening strip. When the screening strip is reversed around deflecting pulleys 6 and 7, there are no larger openings in which solids could get stuck. The filter elements can be adjusted based on their shape so that there is no large opening anywhere on the screening strip during reversing. Since all carrying rods 12 have the same length, the individual groups 14 of screening links 14 [sic] can easily be replaced in groups for repair purposes.

Deviating from the exemplary embodiments that are shown, it is possible to alternate adjacent screening links with or without discharge hooks on one carrying rod 12.

The invention claimed is:

1. A screening grid for discharging solids from a liquid flow, the grid comprising
   a driveable screening strip that can be inserted into the liquid flow and comprising
   two lateral link chains,
   carrying rods extending between the link chains, and,
   screening links comprising
      two bearing orifice portions connected by a center portion, each bearing orifice portion comprising a respective bearing orifice having an orifice axis, and wherein, for each screening link, each of the two bearing orifice portions is thicker in a direction of the orifice axis of their respective bearing orifices than the center portion connecting the two bearing orifice portions,
      hooks extending non-parallel to the center portion on at least some of the screening links,
      the screening links being divided into groups of adjacent screening links, each group of screening links being arranged on two of the carrying rods such that the two carrying rods extend through the bearing orifices of the two bearing orifice portions, and each group of screening links being arranged on the two carrying rods independent of a preceding and a subsequent group of screening links and extending in a direction of the group between the two carrying rods,
      a projecting part on each of the screening links, all the screening links in each group of screening links having projecting parts on only one end of the screening links, the projecting parts extending in the group direction beyond only one of the two bearing orifice portions without overlapping with projecting parts of any adjacent group of screening links, each of the two bearing orifice portions on each screening link being thicker in a direction of the orifice axis of their respective bearing orifices than the projecting part of the link.

2. The screening grid, according to claim 1, wherein the screening grid defines an endless loop having an inner side and an outer side, and all screening links of at least one of the groups are provided with projecting hooks on the outer side of the screening grid.

3. The screening grid according to claim 2, wherein the hooks are arranged on the projecting parts.

4. The screening grid according to claim 2, wherein the hooks are arranged on center sections of the screening links that bridge the two carrying rods on which the at least one of the groups is arranged.

5. The screening grid according to claim 1, wherein at least one group of screening links has no hooks and is arranged between adjacent preceding and succeeding groups of screening links with hooks.

6. The screening grid according to claim 1, wherein each projecting part of each screening link has, when viewed from a side of the screening link, a shape of a sector with an arc center on an axis of one of the carrying rods on which the screening link is arranged.

7. The screening grid according to claim 1, wherein the screening links of adjacent preceding and succeeding groups are aligned in a longitudinal direction of the screening grid.

8. The screening grid according to claim 1, wherein the screening links of adjacent preceding and succeeding groups are offset in relation to one another in a longitudinal direction of the screening grid by half of a pitch of the screening links.

9. The screening grid according to claim 1, wherein the screening links of each group are arranged directly adjacent to one another on the two carrying rods and have lateral spacer sleeves.

10. The screening grid according to claim 1, wherein adjacent screening links of each group are separated by spacer sleeves.

11. The screening grid according to claim 1, wherein the carrying rods can be removed and replaced without interrupting the link chains.

12. The screening grid according to claim 1, wherein screening links with and without discharge hooks are alternately arranged on a carrying rod.

* * * * *